(12) United States Patent
Yamauchi et al.

(10) Patent No.: US 8,135,931 B2
(45) Date of Patent: Mar. 13, 2012

(54) INFORMATION EQUIPMENT, METHOD FOR SUPPORTING OPERATION THEREOF, AND COMPUTER-READABLE STORAGE MEDIUM FOR COMPUTER PROGRAM

(75) Inventors: Kana Yamauchi, Anjo (JP); Toshihisa Motosugi, Okazaki (JP); Jiro Goto, Toyokawa (JP); Shin Ohba, Toyokawa (JP)

(73) Assignee: Konica Minolta Business Technologies, Inc., Chiyoda-Ku, Tokyo (JP)

( * ) Notice: Subject to any disclaimer, the term of this patent is extended or adjusted under 35 U.S.C. 154(b) by 0 days.

(21) Appl. No.: 12/857,706

(22) Filed: Aug. 17, 2010

(65) Prior Publication Data
US 2011/0040944 A1 Feb. 17, 2011

(30) Foreign Application Priority Data
Aug. 17, 2009 (JP) .................................. 2009-188779

(51) Int. Cl.
*G06F 13/10* (2006.01)
(52) U.S. Cl. ....................................................... 711/163
(58) Field of Classification Search ........................ None
See application file for complete search history.

(56) References Cited

U.S. PATENT DOCUMENTS
2006/0195890 A1 8/2006 Funaki

FOREIGN PATENT DOCUMENTS

| JP | 2003-085179 A | 3/2003 |
|----|---------------|--------|
| JP | 2006-243828 A | 9/2006 |
| JP | 2007-293515 A | 11/2007 |
| JP | 2008-294572 A | 12/2008 |
| JP | 2009-152730 A | 7/2009 |

OTHER PUBLICATIONS

Office Action (Decision to Grant a Patent) dated Mar. 15, 2011, issued in the corresponding Japanese Patent Application No. 2009-188779, and an English Translation thereof.

*Primary Examiner* — Duc Doan
(74) *Attorney, Agent, or Firm* — Buchanan Ingersoll & Rooney PC

(57) ABSTRACT

Information equipment having a memory area for which access restrictions are set is provided. The information equipment makes a determination, in response to operation for turning a security mode into a security level enhanced mode, on data in the memory area, whether or not any one of the following conditions satisfy security requirements after the security level is enhanced: access restrictions set for the data itself; access restrictions set for the memory area; and authentication information for a user who has stored the data, and sends, to the user who has stored the corresponding data in the memory area or a user who has set the access restrictions for the memory area storing the corresponding data therein, a message to prompt one of the users to perform operation for satisfying the security requirements.

15 Claims, 13 Drawing Sheets

FIG. 5

41 USER REGISTRATION TABLE

| | 411 | 412 | 413 | 414 | 415 |
| NO. | ID | PASSWORD (PW) | USER NAME | E-MAIL ADDRESS | TEL. NUMBER |
|---|---|---|---|---|---|
| 01 | | | | | |
| 02 | | | | | |
| 03 | | | | | |

FIG. 6

42 SECURITY REQUIREMENTS TABLE

| SECURITY ENHANCED MODE | PASSWORD DIGIT NUMBER (421) | PASSWORD LETTER TYPE (422) |
|---|---|---|
| NO (ENHANCED MODE OFF) | 4-8 DIGITS | NUMERIC-ONLY PASSWORD PERMITTED |
| YES (ENHANCED MODE ON) | 8-10 DIGITS | NUMERIC-ONLY PASSWORD DENIED |

FIG. 7

43 BOX MANAGEMENT TABLE

| NO. | TYPE | CREATOR | PASSWORD (PW) |
|---|---|---|---|
| 01 | SHARED | ADMINISTRATOR | ---- |
| 02 | PERSONAL | USER A | ******** |
| 03 | PERSONAL | USER B | **** |
| 12 | GROUP | USER E | **** |

44 FILE MANAGEMENT TABLE

| BOX (441) | FILE NAME (442) | CREATOR (443) | PASSWORD (PW) (444) | FILE ATTRIBUTE (445) |
|---|---|---|---|---|
| 01 | ···.tif | USER K | ---- | ---- |
| 01 | ····.txt | USER E | ---- | BACKGROUND PATTERN ADDED |
| 01 | ····.pdf | USER G | ---- | ---- |
| 02 | ·····.*** | USER A | ---- | ---- |
| 02 | ·····.*** | USER A | ---- | ---- |

FIG. 9

| USER | | DATA | SHARED BOX | | PERSONAL BOX | | GROUP BOX | |
|---|---|---|---|---|---|---|---|---|
| | | | SATISFY | NOT SATISFY | SATISFY | NOT SATISFY | SATISFY | NOT SATISFY |
| SATISFY | | DATA | SATISFY | SATISFY | SATISFY | SATISFY | SATISFY | SATISFY |
| | | | NOT SATISFY | NOT SATISFY | NOT SATISFY | NOT SATISFY | NOT SATISFY | NOT SATISFY |
| | | | EMPTY | EMPTY | EMPTY | EMPTY | EMPTY | EMPTY |
| NOT SATISFY | | DATA | SATISFY | SATISFY | SATISFY | SATISFY | SATISFY | SATISFY |
| | | | NOT SATISFY | NOT SATISFY | NOT SATISFY | NOT SATISFY | NOT SATISFY | NOT SATISFY |
| | | | EMPTY | EMPTY | EMPTY | EMPTY | EMPTY | EMPTY |

☐ : ENHANCING THE SECURITY LEVEL IS NOT TO BE REQUESTED.

▨ : ENHANCING THE SECURITY LEVEL IS TO BE REQUESTED.

INFORMATION EQUIPMENT, METHOD FOR SUPPORTING OPERATION THEREOF, AND COMPUTER-READABLE STORAGE MEDIUM FOR COMPUTER PROGRAM

This application is based on Japanese patent application No. 2009-188779 filed on Aug. 17, 2009, the contents of which are hereby incorporated by reference.

BACKGROUND OF THE INVENTION

1. Field of the Invention

The present invention relates to information equipment shared by a plurality of users and a method for supporting the operation of the information equipment.

2. Description of the Related Art

Multifunction devices are one example of information equipment that is used for business purposes and called Office Automation (OA) equipment. Such multifunction devices have recently been known as Multi-Function Peripherals (MFPs) having a variety of functions, such as copying, printing, image inputting, fax communication, electronic mail communication, and document data storage. Such a multifunction device is connected to an intranet, and operates in response to input operation through an operational panel provided in the multifunction device or in response to access from a computer connected to the intranet.

Such multifunction devices generally have a security function for user authentication. A typical authentication method involves comparing a user ID and a password entered by a user to use a multifunction device with a user ID and a password registered in advance. If there is a match therebetween, then the user is successfully authenticated. If the authentication fails, the use of the multifunction device by the user is partly or entirely limited.

A password can be set also for a memory area called a box to save document data therein (see Japanese Laid-open Patent Publication No. 2003-085179). A user of a box enters a set password, and thereby, is allowed to access the box. The user can read out data from the box and store data therein. A part of the memory area of a storage device such as a hard disk drive is allocated for the box. Examples of the box are a personal box exclusively used by one user and a shared box mutually used by a plurality of users.

Multifunction devices having a plurality of security modes are configured to raise or lower the security level thereof depending on the environment for the use thereof and the operational situation thereof. In general, if the security level of a multifunction device is enhanced, the operation thereof becomes complicated. For example, if the security level is raised, a user is required to enter a password having a digit greater than that of a password used before raising the security level. In view of this, it may be conceived that the multifunction device is used in such a manner that the security level thereof is not enhanced usually, and the security mode is appropriately turned into a security enhanced mode, for example, only when the multifunction device is temporarily shared by users belonging to other sections.

There is proposed a conventional technique for switching between security modes of an image forming apparatus (Japanese Laid-open Patent Publication No. 2008-294572). According to the technique, if the image forming apparatus stores a confidential job therein at a time when the security mode is turned into a mode for reducing the security level, the image forming apparatus issues a warning and displays information for prompting a user to delete the confidential job, or deletes the confidential job. The technique prevents an undesirable situation in which a person other than the user can easily access the confidential job.

In the case where information equipment is shared by a plurality of users, in general, an administrator is appointed and the administrator operates the information equipment to perform operation for switching between security modes thereof. Suppose that a plurality of users already use the information equipment on a daily basis, and the administrator turns, without prior notice, the security mode thereof into a mode to raise the security level. In such a case, there is a high possibility that a user who has registered a password not meeting password regulations corresponding to the raised security level cannot access the information equipment itself or a box stored therein. In order to avoid this, the administrator usually sends a notice to users in advance to request them to change their passwords for authentication.

Some of the users may, however, forget to change their passwords. If a user forgets to change his/her password, or a user is not aware of the notice from the administrator, it may turn out that such a user does not respond to the request from the administrator. In order to prevent such a situation from occurring, the administrator is required to check whether or not raising the security level affects access by all the users, which is a great burden to the administrator.

SUMMARY

The present disclosure is directed to solve the problems pointed out above, and therefore, an object of an embodiment of the present invention is to reduce the burden imposed on an administrator who performs operation for enhancing the security level.

According to an aspect of the present invention, information equipment connectable to a network is provided. The information equipment includes a memory area for which access restrictions are set to limit access by a user, a determination portion that makes a determination, in response to operation for turning a security mode into a mode to enhance a security level, on data stored in the memory area, whether or not any one of the following three conditions satisfies security requirements after the security level is enhanced: access restrictions set for the data itself; access restrictions set for the memory area; and user authentication information registered in advance for a user who has stored the data in the memory area, and an informing portion that receives, from the determination portion, a determination result indicating that none of the three conditions satisfies the security requirements, and sends through the network, to at least one of the user who has stored the data corresponding to the determination result in the memory area and a user who has set the access restrictions for the memory area storing therein the data corresponding to the determination result, a message to prompt the one of the users to perform operation for satisfying the security requirements.

According to another aspect of the present invention, a method is provided for supporting operation of information equipment that includes a memory area for which access restrictions are set to limit access by a user and is connectable to a network. The method causes the information equipment to perform a process comprising in response to operation for turning a security mode into a mode to enhance a security level, a step of making a determination on data stored in the memory area whether or not any one of the following three conditions satisfies security requirements after the security level is enhanced: access restrictions set for the data itself; access restrictions set for the memory area; and user authentication information registered in advance for a user who has stored the data in the memory area, and a step of sending through the network, if data not satisfying any of the three conditions is found, to at least one of the user who has stored the data in the memory area and a user who has set the access restrictions for the memory area storing therein the data, a message to prompt the one of the users to perform operation for satisfying the security requirements.

These and other characteristics and objects of the present invention will become more apparent by the following descriptions of preferred embodiments with reference to drawings.

BRIEF DESCRIPTION OF THE DRAWINGS

FIG. 5 is a diagram illustrating an example of items of a user registration table.

FIG. 6 is a diagram illustrating an example of items of a security requirements table.

FIG. 7 is a diagram illustrating an example of items of a box management table.

FIG. 8 is a diagram illustrating an example of items of a file management table.

FIG. 9 is a diagram illustrating an example of classification to determine whether a user is or is not required to enhance the security level.

DESCRIPTION OF THE PREFERRED EMBODIMENTS

Figure 1:
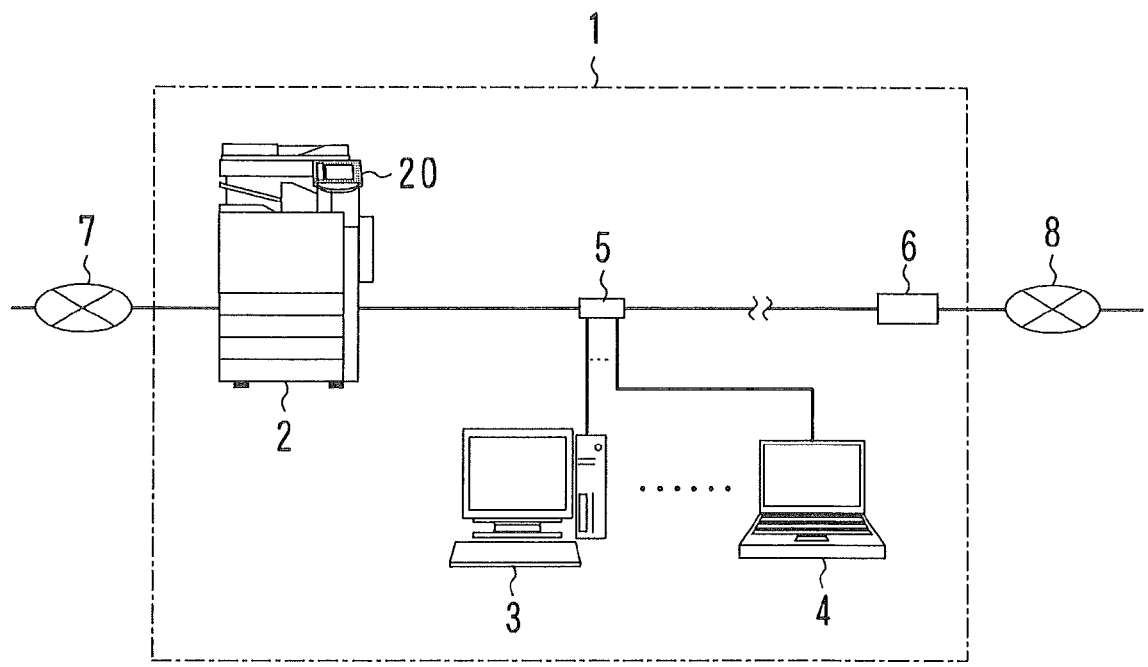
FIG. 1 is a diagram illustrating an example of the configuration of a network including a multifunction device according to an embodiment of the present invention.

A multifunction device as an image forming apparatus having a variety of functions is herein taken as an example of information equipment configured to switch between security modes. A description is provided of an information processing system 1, as illustrated in FIG. 1, including a multifunction device 2 and a plurality of personal computers 3 and 4. The information processing system 1 includes a Local Area Network (LAN) installed in offices of business or offices of organizations similar thereto. The information processing system 1 is connected to a public line 7 through the multifunction device 2, and connected to the Internet 8 through a router 6. The multifunction device 2 also called an MFP can be used as a copier, a printer, an image scanner, a facsimile machine, an electronic mail sender/receiver, and a data storage device for saving documents therein. The multifunction device 2 and the personal computers 3 and 4 are configured to communicate with one another through a switching hub 5.

Figure 2:
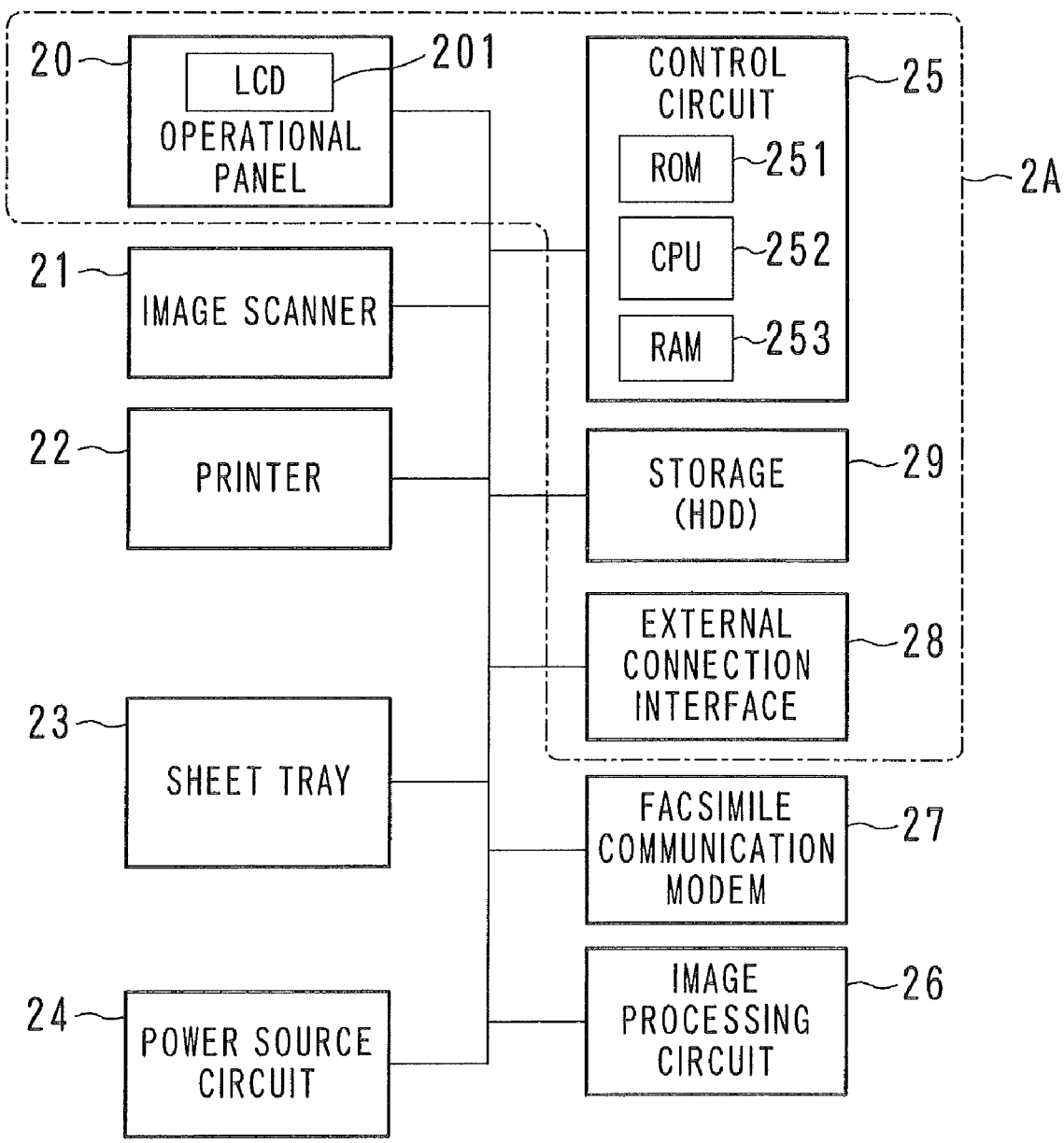
FIG. 2 is a block diagram illustrating an example of the hardware configuration of a multifunction device.

FIG. 2 illustrates an example of the hardware configuration of the multifunction device 2. The multifunction device 2 includes an operational panel 20, an image scanner 21, a printer 22, a sheet tray 23, a power source circuit 24, a control circuit 25, an image processing circuit 26, a facsimile communication modem 27, an external connection interface 28, and a storage 29. The operational panel 20, the control circuit 25, the external connection interface 28, and the storage 29 constitute a main part 2A necessary for switching between security modes. The operational panel 20 is provided with a Liquid Crystal Display (LCD) as a display 201 on which an operation screen is displayed. The image scanner 21 is capable of scanning a color document. The printer 22 is provided with a unit for duplex printing, and is operable to print a monochrome or color image on a single side or both sides of paper supplied from the multi-stage sheet tray 23. The power source circuit 24 supplies necessary power to any portions of the multifunction device 2. The control circuit 25 is configured of a ROM 251 for storing a control program thereon, a Central Processing Unit (CPU) 252 for executing a control program, and a RAM 253 used as a work area for executing programs. The image processing circuit 26 performs a variety of processes including a process of converting an original image into a bitmap format for copying or printing. The facsimile communication modem 27 is used in communication through the public line 7. The external connection interface 28 is used for connection to a LAN cable. The storage 29 in this example is a Hard Disk Drive (HDD) having a non-volatile memory area with a large capacity equal to or greater than several tens of gigabytes.

Figure 3:
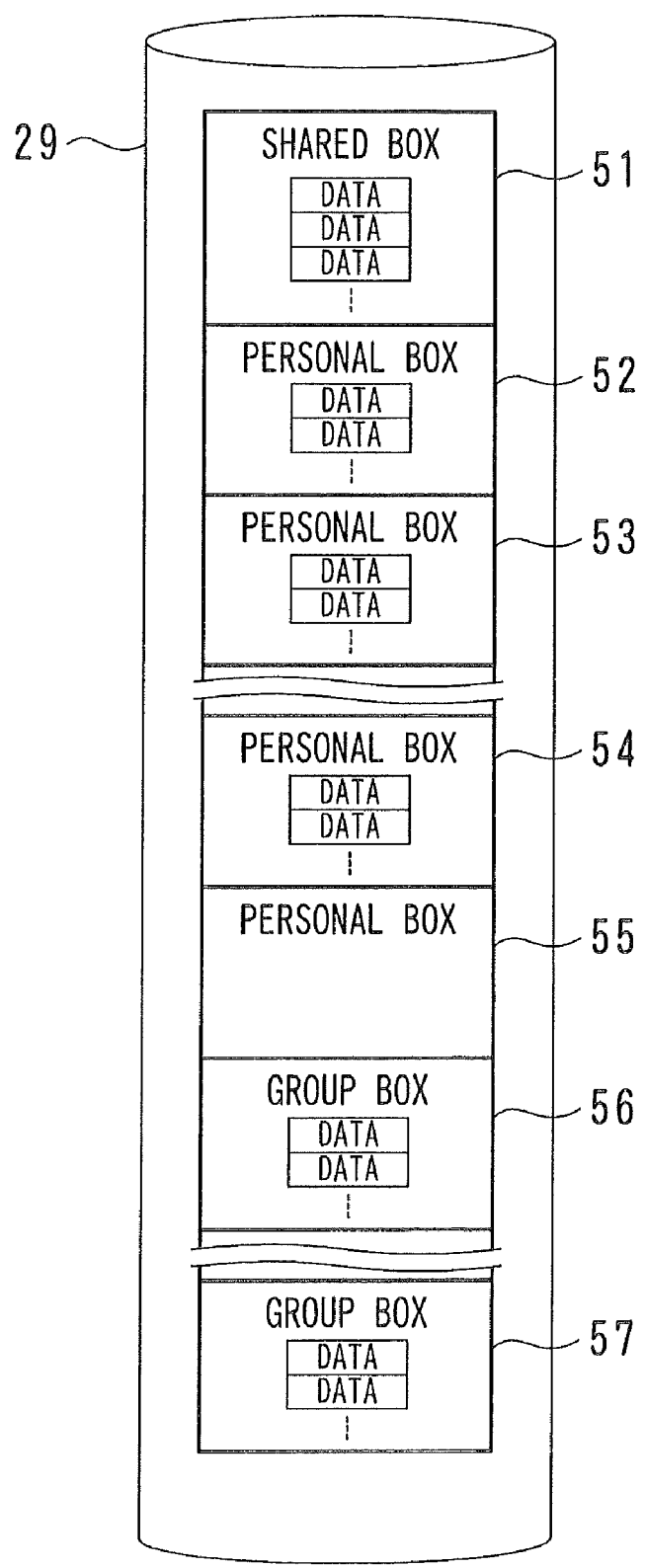
FIG. 3 is a diagram illustrating an example of how boxes are provided as memory areas.

The storage 29 has a memory area in which data used for control of the multifunction device 2 is stored, and a box that is a memory area in which a variety of documents and images are saved. Referring to FIG. 3, the storage 29 has a shared box 51 mutually used by a plurality of users of the multifunction device 2, personal boxes 52, 53, 54, and 55 each of which is used only by a specific user, and group boxes 56 and 57 each of which is allocated to a group of a plurality of users. Passwords can be set individually for the boxes 51-57 to restrict access by users.

Some of document data stored in the boxes 51-57 are given read-only passwords by application software that has created the document data. Various types of data encrypted by predetermined software are also stored in the boxes 51-57. In order for a user to browse the details of data that has been protected as described above, the user is required to go through a user authentication process to use the multifunction device 2, and also required to enter a password that has been set for the data itself. If a password is set for a box storing the data therein, the user is also required to enter a password for the box. Otherwise, the user is not allowed to access the data.

With the multifunction device 2 of this example, two security modes, i.e., a non-enhanced mode and an enhanced mode can be selected. Another configuration is also possible in which a multiple of security levels can be set by providing three or more security modes. In the enhanced mode, access to the multifunction device 2 and the boxes 51-57 is severely restricted as compared to the case of the non-enhanced mode. The enhanced mode, for example, uses password regulations that a password should have eight digits or more. Turning the security mode from the non-enhanced mode into the enhanced mode raises the security level. An administrator determined for operation of the information processing system 1 performs operation for selecting the security mode.

Figure 4:
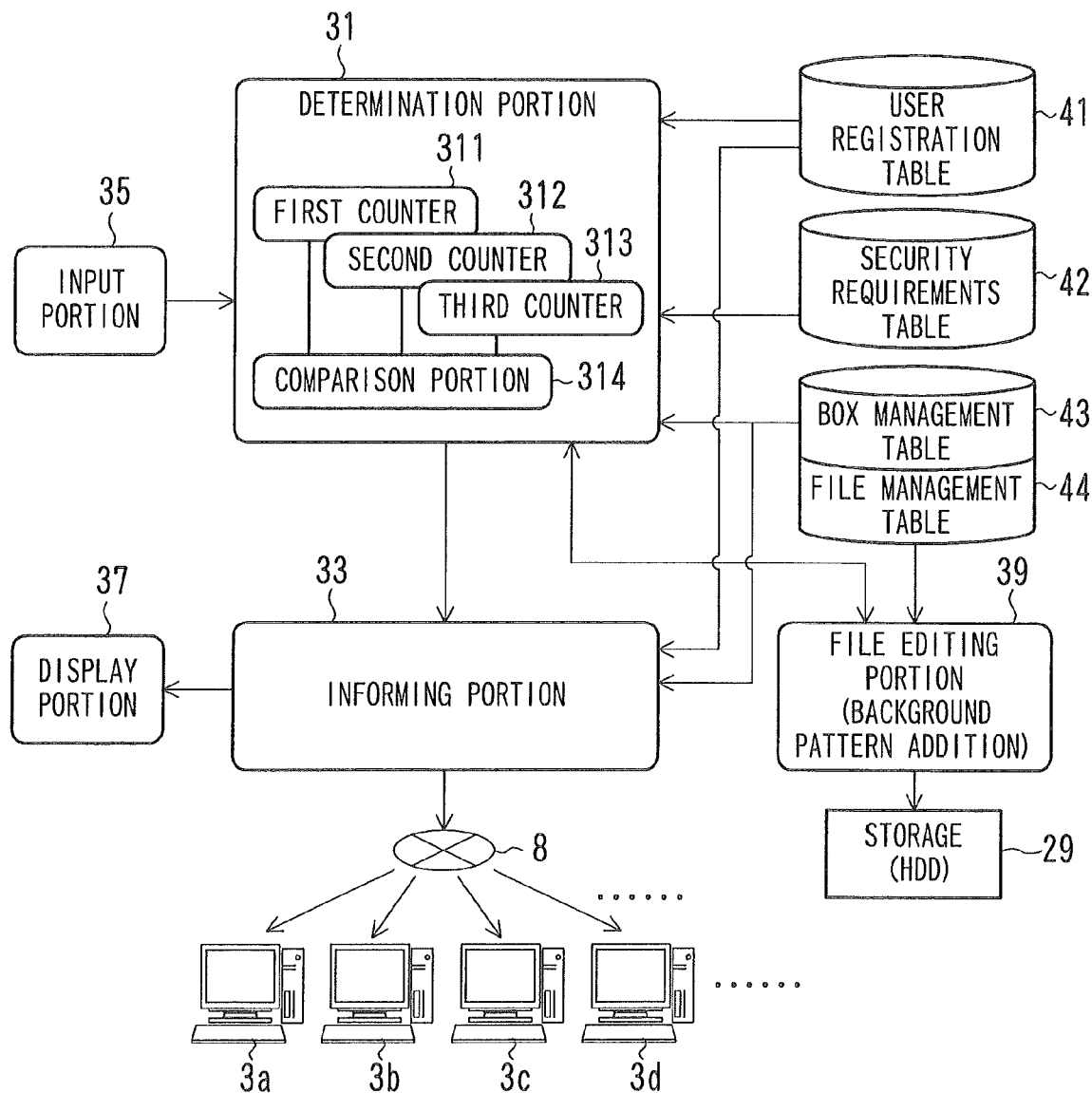
FIG. 4 is a diagram illustrating an example of the functional configuration of the main part of a multifunction device.

FIG. 4 illustrates the functional configuration of the multifunction device 2 for switching between security modes. Referring to FIG. 4, the multifunction device 2 is configured of a determination portion 31, an informing portion 33, an input portion 35, a display portion 37, a file editing portion 39, and the like. A computer program for control and the CPU 252 that is a computer executing the computer program implement these functional elements of the multifunction device 2. The determination portion 31 includes a first counter 311, a second counter 312, a third counter 313, and a comparison portion 314.

The determination portion 31 serves to make a determination on data stored in the boxes 51-57 in response to operation for enhanced mode selection received by the input portion 35. To be specific, the determination portion 31 determines whether or not any one of the following three conditions satisfies security requirements for the enhanced mode. The first condition is access restrictions set for the individual pieces of data. The second condition is access restrictions through passwords set for boxes storing the individual pieces of data. The third condition is user authentication information (passwords) registered in advance for users who are creators of the individual pieces of data. Herein, the access restrictions set for data itself are, for example, setting a password for the data, encrypting the data, and adding a background pattern to the data. The access restrictions through passwords are related to the presence/absence of a password, a digit number of the password, and the type of a letter included in the password. A creator of data is a user who has issued a job for storing the data to the multifunction device 2. Upon making such a determination, the determination portion 31 refers to a user registration table 41, a security requirements table 42, a box management table 43, and a file management table 44. The storage 29 stores these tables 41-44 therein. The tables 41-44 are loaded to the RAM 252 if necessary.

The first counter 311 of the determination portion 31 calculates the number of users whose passwords for user authentication registered in the user registration table 41 do not satisfy the security requirements specified in the security requirements table 42. The second counter 312 calculates the number of boxes for which access restrictions indicated in the box management table 43 do not satisfy the security requirements. The third counter 313 calculates the amount of data (quantity of pieces of data) for which access restrictions indicated in the file management table 44 do not satisfy the security requirements. The comparison portion 314 compares the calculated values obtained by the three counters 311-313 with one another, and conveys, to the informing portion 33, the comparison result indicating which of the three, i.e., the number of users, the number of boxes, and the amount of data, is the smallest value.

When receiving the determination result from the determination portion 31, the informing portion 33 sends a user a message to prompt him/her to perform operation for meeting the security requirements. Note that the informing portion 33 sends the message only when unsecured data is present. The unsecured data herein is data that is not satisfying the security requirements for the enhanced mode in any of the following respects: a password for authentication of a creator of the data; access restrictions for a box storing the data therein, mainly a password of the box; and access restrictions for the data itself, e.g., a password, encryption, and a background pattern of the data. Unless such unsecured data is stored in the storage 29, the informing portion 33 of this example does not send the message.

The user to whom the message is to be sent is not limited only to a creator of the unsecured data. In one case, the message is sent to a creator of the unsecured data. In the other case, the message is sent to a creator of a box storing the unsecured data therein, i.e., a user who has set a password of the box. Whether the message is to be sent to a creator of the data or a creator of the box depends on the comparison result obtained by the comparison portion 314. In the case where the calculated value by the first counter 311 is the smallest value as compared with the other two calculated values, the message is sent to a user who is the calculation target of the first counter 311, i.e., a user whose password for authentication does not satisfy the security requirements, among creators of unsecured data that is the calculation target of the third counter 311. In the case where the calculated value by the second counter 312 is the smallest value as compared with the other two, the message is sent to a creator of a box that is the calculation target of the second counter 312. In the case where the calculated value by the third counter 313 is the smallest value as compared with the other two, the message is sent to a creator of unsecured data that is the calculation target of the third counter 313.

The message is, for example, described in the body of an electronic mail message or attached to an electronic mail message, and the electronic mail message is sent to a mail server (not shown) provided in the Internet 8 or the LAN (information processing system 1). The mail server transfers the electronic mail message to a personal computer 3a, 3b, 3c, or 3d used by a user, so that the user including a box creator receives the message. The message may be delivered to the user through message communication of the LAN or facsimile communication instead of through electronic mail.

When receiving the message, the user changes the current password to a new password satisfying the password regulations in accordance with instructions included in the message. If the user is a creator of a box whose security level should be raised, then the user changes at least the current password of the box to another password. In this way, even if a plurality of pieces of unsecured data are contained in the box, the problem of the lack of security is solved without changing the passwords for the individual pieces of data. On the other hand, if the user is not a creator of the box, then the user changes at least one of the two passwords, i.e., the current password for authentication and the current password for the data itself. The user may change only the password for the data itself. However, if there is a plurality of pieces of data whose passwords should be changed, changing the password for authentication saves the user from the burdensome task. From the viewpoint of the security of the entire multifunction device 2, it is more desirable to change the password for authentication rather than the password for the data itself if only one of these passwords is to be changed.

The informing portion 33 not only transmits a message to a user but also provides the administrator with information. In the case where the smallest value of the calculated values by the three counters 311-313 of the determination portion 31 is smaller than a preset value, the informing portion 33 informs the display portion 37 as to which user (a creator of data or a creator of a box to whom the message is to be sent) corresponds to the smallest value. Responding to this, the display portion 37 displays, on the display 201 of the operational panel 20, information on the name of the user conveyed by the determination portion 31 and contact information thereof. The administrator operating the operational panel 20 to perform operation for selecting the enhanced mode sees the user information displayed on the display 201. Responding to this, the administrator may directly see the user corresponding to the user information or make a call to the user, thereby to request him/her to change the current password to a new password. Such a direct request from the administrator is an effective approach to the user. As long as the preset value is set to be approximately 5 through 10, there is no large load placed on the administrator.

The file editing portion 39 is a background pattern adding means to reduce the amount of unsecured data. If the storage 29 stores, therein, first image data to which a background pattern is added, and a part of the unsecured data is second image data to which no background pattern is added and which is stored in the storage 29 in accordance with a request from a user who has caused the storage 29 to store, therein, the first image data, then the file editing portion 39 adds, to the second image data, the same background pattern as that added to the first image data. In the meantime, in the process of printing a document, a background pattern is applied to the document. Then, when the document is copied, a predetermined character or drawing as the background pattern becomes visible in the copy. The addition of a background pattern is psychologically effective in discouraging duplication of such a document. In view of this, the addition of a background pattern is a way to solve the problem of the lack of security in this embodiment.

Referring to FIG. 5, the user registration table 41 includes, as registered data items, an identification code (ID) 411, a password 412 for authentication, a user name 413, an electronic mail address 414, and a telephone number 415. The determination portion 31 and the informing portion 33 refer to the user registration table 41. Referring to FIG. 6, the security requirements table 42 includes, as registered data items, a password digit number 421 and a password letter type 422. Referring to FIG. 7, the box management table 43 includes, as registered data items, a type 431, a creator 432, and a password 433. Referring to FIG. 8, the file management table 44 includes, as registered data items, a box 441 as a storage location of a file, a file name 442, a creator 443, a password 444, and a file attribute 445. Information indicated in the file attribute 445 includes information on a background pattern.

FIG. 9 illustrates an example of classification to determine whether a user is or is not required to enhance the security level. In the illustrated example, a shaded part represents a case in which a message is sent to a user to request him/her to enhance the security of data. In FIG. 9, the combination of a "user" and "satisfy" means that an authentication password of the user satisfies the security requirements. The combination of a "user" and "not satisfy" means that an authentication password of the user does not satisfy the security requirements. As for each of a "shared box", a "personal box", and a "group box", the following two cases are provided: a case in which a password set therefor satisfies the security requirements; and a case in which a password set therefor does not satisfy the security requirements. A case in which no password is set is regarded as a case in which the security requirements are not satisfied. It is possible to classify states in which data is stored in the individual boxes into three cases. The first case corresponds to a case in which all of the data stored in the box satisfy the security requirements. The second case corresponds to a case in which the box has at least one piece of data for which access restrictions, e.g., a password, encryption, or a background pattern of the data, do not satisfy the security requirements. The third case corresponds to a case in which no data is stored in the box, i.e., the box is empty, or, in other words, the box is not used substantially. As long as the box is empty, a creator of the box is not required to enhance the security of the box even if the password of the box does not satisfy the security requirements. This is because there is no data in the box; so, it is unnecessary to worry about information leakage.

In this embodiment, a case of requiring a user to enhance the security corresponds to a shaded part as illustrated in FIG. 9. To be specific, such a case is a case in which none of a user, a box, and data satisfies the security requirements. To be more specific, a user or a creator of a box is required to enhance the security if an authentication password of the user does not satisfy the security requirements, further, if a password set for the box does not satisfy the security requirements, and further if access restrictions set for the data itself do not satisfy the security requirements. Stated differently, the user or the creator of a box is not required to enhance the security, as long as at least one of these ways to satisfy the security requirements is applied. As described above, this embodiment minimizes the cases of requesting a user to enhance the security in order to prevent information leakage. This reduces the burden on the user performing the operation for enhancing the security in response to the request. In contrast, suppose that a user is requested to enhance the security for everything and anything, e.g., even when one of two or more security countermeasures on data or a box does not satisfy the security requirements. Such a situation bothers the user and he/she may not respond to the request promptly. This consequently may impede the progress of the security enhancement.

Figure 10:
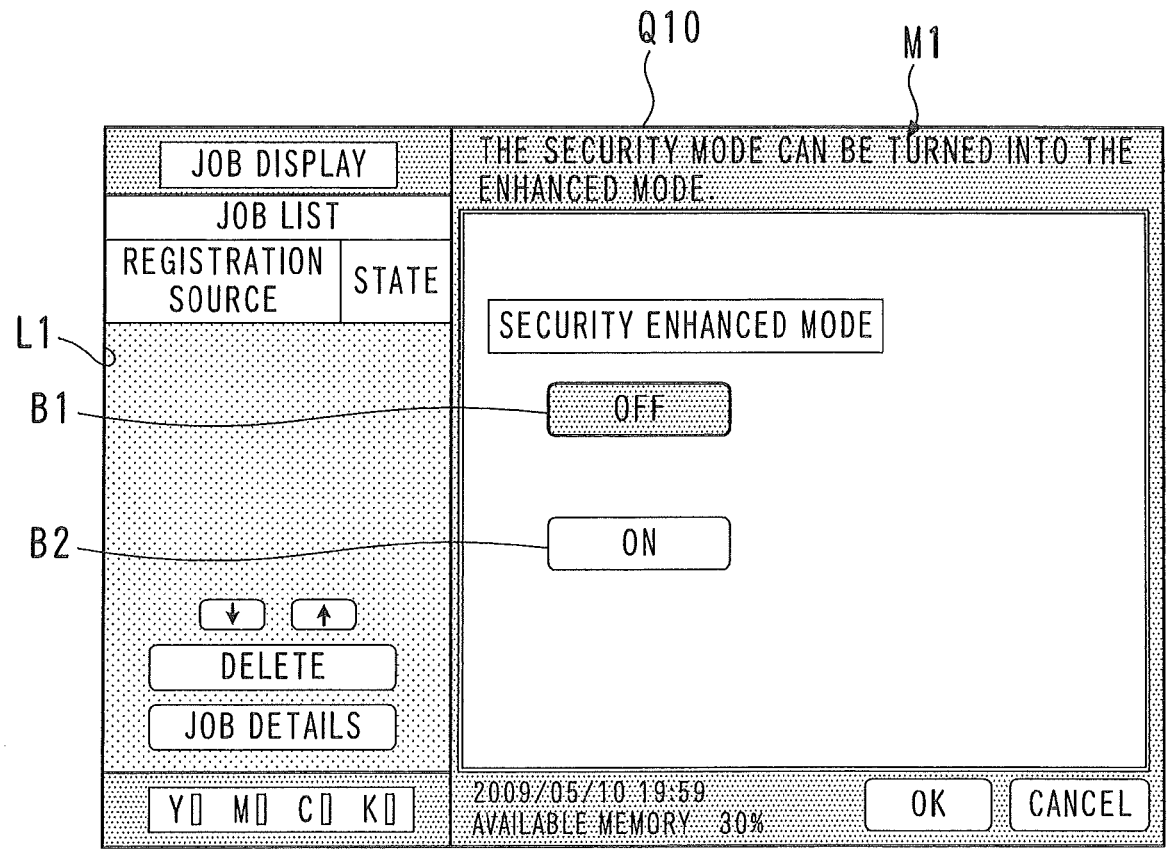
FIG. 10 is a diagram illustrating an example of a security mode switching screen for security setting operation.

FIG. 10 illustrates an example of a security mode switching screen for security setting operation. The administrator of the multifunction device 2 operates the operational panel 20 to perform predetermined input operation such as entering an administrator password. Then, a security mode changing screen Q10 as illustrated in FIG. 10 is displayed on the display 201. Referring to FIG. 10, a job list L1 is provided on the left side of the security mode changing screen Q10, and a guidance message M1 and two setting buttons B1 and B2 are displayed on the right side of the job list L1. The setting button B1 (OFF button) is pressed to turn the security mode from the enhanced mode into the non-enhanced mode, while the setting button B2 (ON button) is pressed to turn the security mode from the non-enhanced mode into the enhanced mode. In the illustrated example, the setting button B1 is highlighted to indicate that the security mode is set to the non-enhanced mode. A list of jobs waiting to be executed which are issued by the computers 3 and 4 is displayed in the form of the job list L1. Switching between security modes is usually performed when there are no jobs waiting to be executed. Referring to FIG. 10, no jobs are indicated in the job list L1. This means that there are no jobs waiting to be executed.

Figure 11:
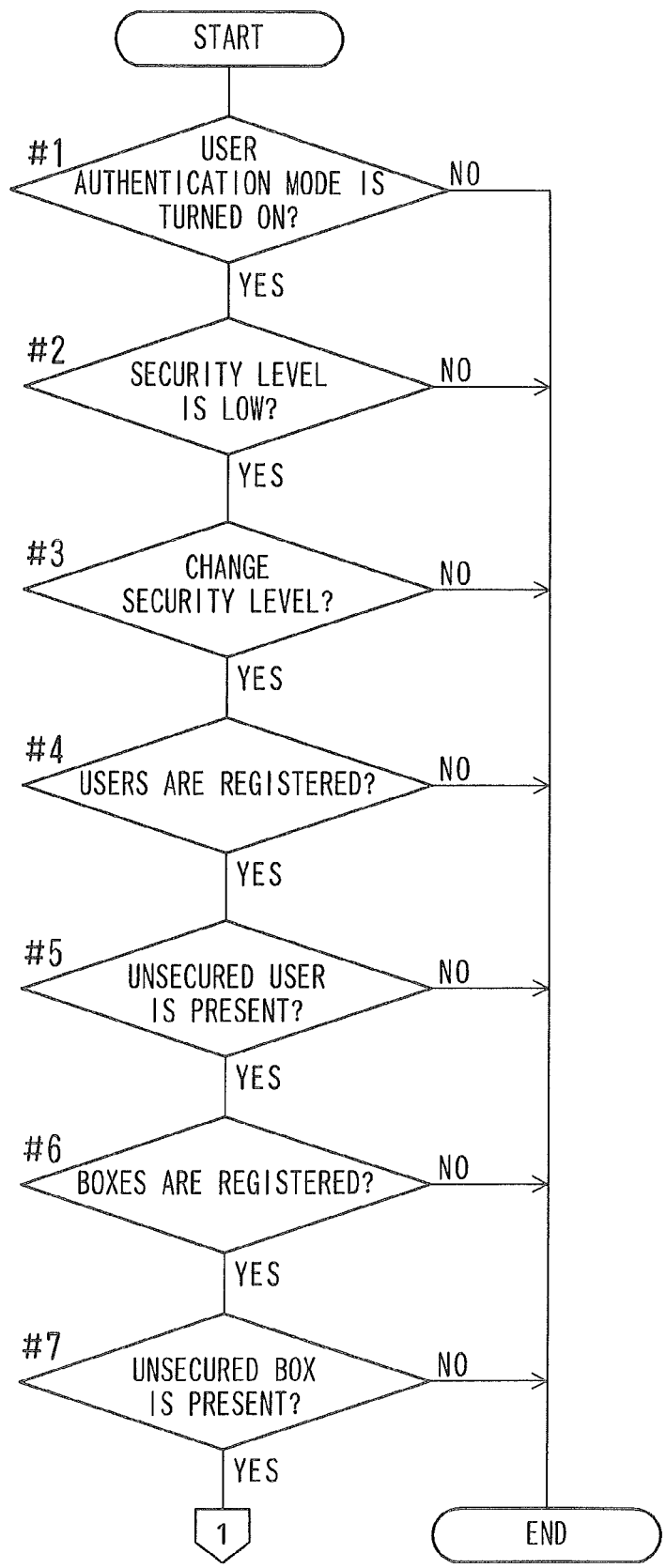
FIG. 11 is a flowchart illustrating an example of operation performed by a multifunction device for a case where a user is required to enhance the security level.
Figure 12:
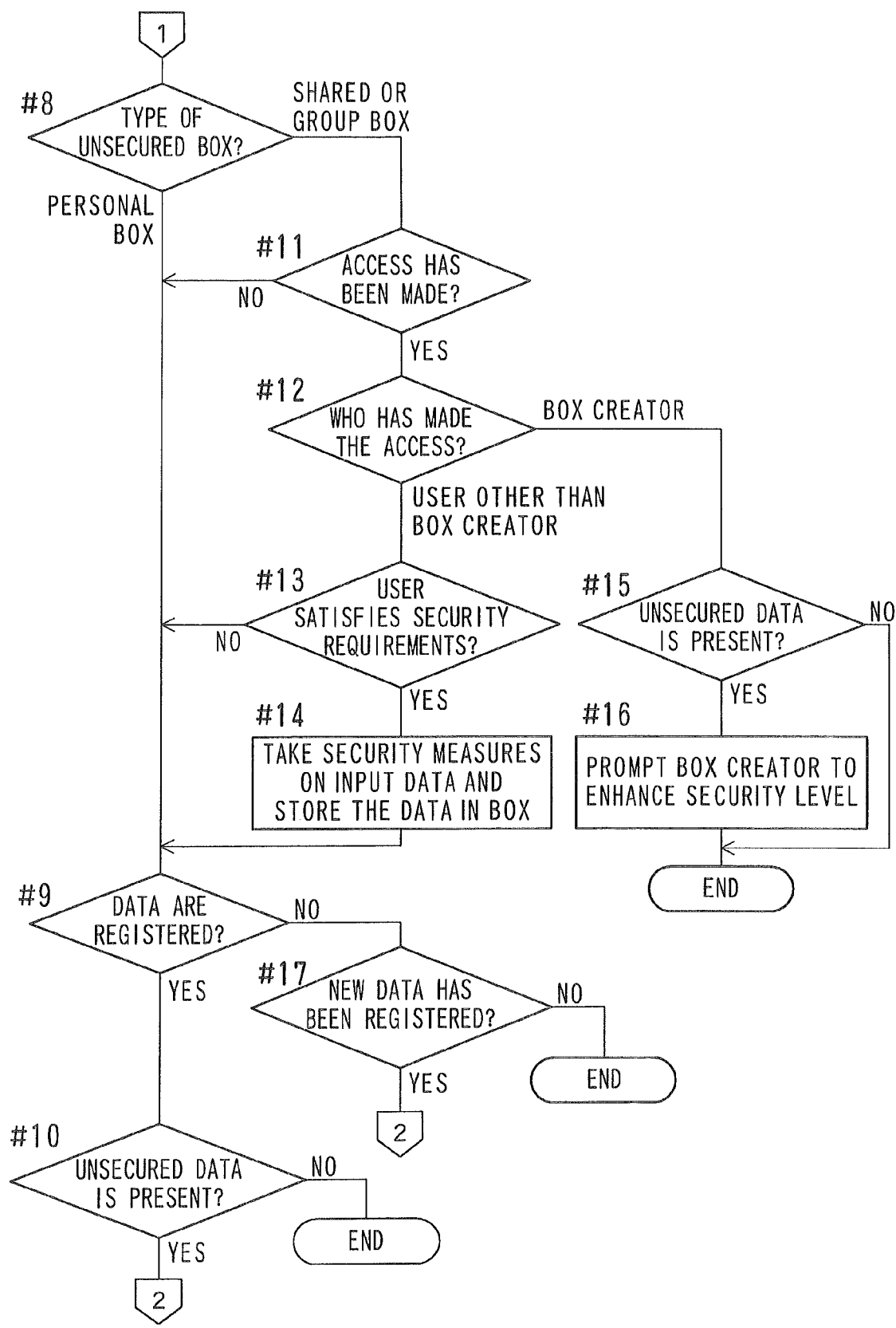
FIG. 12 is a flowchart illustrating an example of operation performed by a multifunction device for a case where a user is required to enhance the security level.
Figure 13:
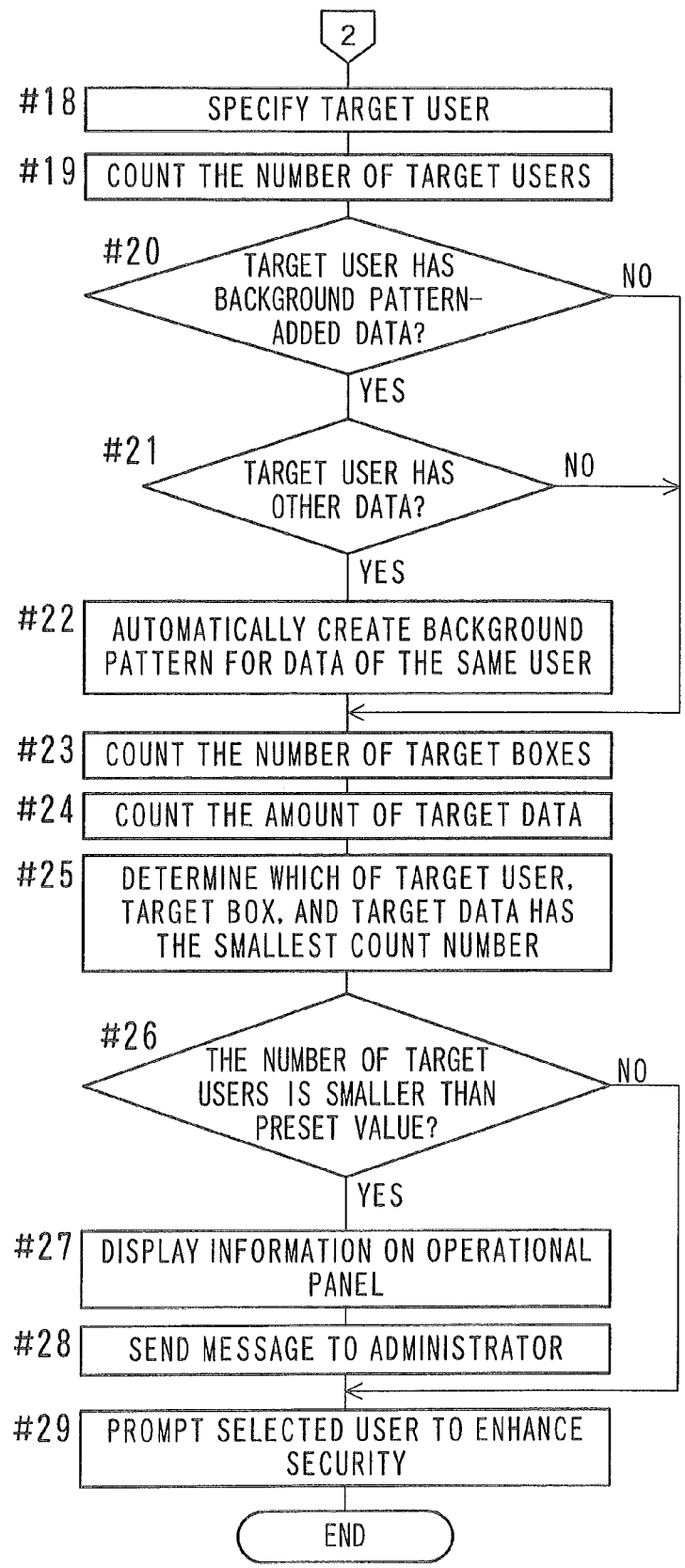
FIG. 13 is a flowchart illustrating an example of operation performed by a multifunction device for a case where a user is required to enhance the security level.

The following is a description as to how the multifunction device 2 operates to enhance the security, with reference to flowcharts of FIGS. 11-13.

When the multifunction device 2 is in an authentication function ON state for performing user authentication, and operation for switching between security modes to enhance the security is performed (#1, #2, and #3), the determination portion 31 starts a determination process. The determination portion 31 determines whether or not registered users include a user whose password for authentication does not satisfy the security requirements, i.e., whether or not an unsecured user is present (#4 and #5). Sending a message is unnecessary if no unsecured user is present. Only when an unsecured user is found, the determination portion 31 determines whether or not registered boxes include a box for which a password not satisfying the security requirements is set, i.e., whether or not an unsecured box is present (#6 and #7). Sending a message is unnecessary if no unsecured box is registered. If sending a message is unnecessary, the multifunction device 2 does not perform the process in Step #8 of FIG. 12 and beyond.

When an unsecured box is found, the determination portion 31 determines whether the unsecured box is a personal box or a box other than the personal box (#8). If the unsecured box is a shared box 51 or a group box 56 or 57, then the determination portion 31 checks, in response to access made by a creator of the unsecured box, whether or not the unsecured box contains unsecured data (#11, #12, and #15). If such unsecured data is contained, the informing portion 33 sends, to the creator of the unsecured box, a message to request him/her to raise the security level of the unsecured box (#16). If a user who is not the creator of the unsecured box and whose password for authentication satisfies the security requirements accesses to the unsecured box in order to store new data therein, the file editing portion 39 encrypts the new data or takes other security measures thereon, and then, stores the new data which has undergone such security measures in the unsecured box (#12, #13, and #14).

If an unsecured box is found irrespective of the type of a box, the determination portion 31 determines whether or not the unsecured box registers data therein (#9). If a plurality of pieces of data are registered therein, and further, a plurality of pieces of unsecured data are found therein, then, the determination portion 31 refers to the file management table 44, and specifies a creator of each piece of the unsecured data as a target user to be selected as the destination of a message (#18). The first counter 311 of the determination portion 31 counts the number of users specified (#19). If no data is registered in the unsecured box, in response to access made by a user who intends to register new data therein (#17), the multifunction device 2 performs the process in Step #18 of FIG. 13 and beyond to prompt the user to enhance the security.

If the specified target user is a creator of data to which a background pattern has been added, the file editing portion 39 adds the background pattern to unsecured data created by that user (#20, #21, and #22). Adding a background pattern to data satisfies the security requirements as discussed above. Accordingly, adding a background pattern to the unsecured data reduces the total amount of unsecured data.

The second counter 312 of the determination portion 31 counts the number of unsecured boxes that are target boxes related to selection of the destination of a message (#23). The third counter 313 counts the amount of unsecured data that are target data related to selection of the destination of a message (#24). The informing portion 33 determines which of the three, i.e., the target user, the target box, and the target data, has the smallest count number, and determines a user to whom the message is to be sent (#25). For example, if the number of target boxes is smaller than each of the amount of target data and the number of target users, then a creator of the target box is determined to be the destination of a message. Alternatively, if the number of target users is smaller than each of the amount of target data and the number of target boxes, then the target user is determined to be the destination of a message. Yet alternatively, if the amount of target data is smaller than each of the number of target users and the number of target boxes, then a user of the target data is determined to be the destination of a message. The informing portion 33 sends a message to a user (including a creator of a box) determined as the destination in this way to require him/her to change settings of access restrictions in order to satisfy the security requirements (#29). As discussed above, the destination of a message is selected in such a manner to minimize the number of destinations, thereby leading to the reduction in the burden necessary for the process imposed on the informing portion 33. Further, the minimum number of users performs the necessary operation in response to the message, and thereby the security can be enhanced.

When the number of target users is smaller than a preset number, the informing portion 33 displays, on the display 201 of the operational panel 20, the name of each target user, and contact information such as an electronic mail address of each target user, and an extension number of a section thereof, and sends a message containing the information displayed to a computer used by the administrator (#26, #27, and #28).

The embodiment described above has a variety of modified examples as follows. It is possible to invalidate an authentication password of a user which does not satisfy the security requirements for the raised security level, to incorporate a one-time password into a message, and to send the message to the user to prompt him/her to make access in order to enhance the security. Further, instead of automatic transmission of a message, a screen may be displayed so that an administrator can prepare for transmission of a message. Further, instead of sending a message to a creator of the shared box 51, the group box 56, or 57, a message may be sent to a creator of unsecured data registered in the shared box 51, the group box 56, or 57. Moreover, only a user whose authentication password does not satisfy the security requirements may be prohibited from making access to a shard box 51, a group box 56, or 57 registering unsecured data therein. Alternatively, all the users mutually using the shard box 51, the group box 56, or 57 may be prohibited from making access thereto.

In the case where one user uses a plurality of boxes or a plurality of pieces of data, messages may be separately sent to the user for each unsecured box or data, then to request him/her to enhance the security thereof. Alternatively, only one message covering all the individual unsecured boxes or unsecured data may be sent to the user, then to request him/her to enhance the security thereof.

Another configuration is possible in which, when a user changes, in response to the message, the current password for one piece of unsecured data in a box to a new password, the current passwords for the other data in the box and the current passwords for data in the other boxes may be changed to new passwords automatically. Alternatively, when a background pattern is created or changed for one piece of data created by a user, a temporary background pattern may be created automatically for other pieces of data created by the user. Yet alternatively, for the purpose of reduction in load imposed on a user, a password or a background pattern may be automatically created and regarded as a temporary password instead of prompting the user to change the security level. It is also possible to make a user select whether passwords are changed at one time or changed separately from one another.

Another configuration is possible in which, unless a user performs operation for raising the security level, i.e., makes access, even after a predetermined amount of time has elapsed since a message was sent, registration for the user is deleted.

The embodiment described above eliminates the need for an administrator to send a message because the message is automatically sent to a user corresponding to data not satisfying the security requirements. In addition, the transmission destination of the message is limited to a user corresponding to data not satisfying the security requirements in any of the data itself, a memory area, and user authentication information. Thus, as compared to the case in which the transmission destination is not limited, the burden of checking whether or not a user receives a message and performs operation properly in accordance with the message is reduced.

While example embodiments of the present invention have been shown and described, it will be understood that the present invention is not limited thereto, and that various changes and modifications may be made by those skilled in the art without departing from the scope of the invention as set forth in the appended claims and their equivalents.

What is claimed is:

1. Information equipment connectable to a network, the information equipment comprising:
   a memory area for which access restrictions are set to limit a first type of user;
   a determination portion that makes a determination, in response to operation for turning a security mode into a mode to enhance a security level, on data stored in the memory area, whether or not any one of the following three conditions satisfies security requirements after the security level is enhanced: access restrictions set for the data itself; access restrictions set for the memory area; and second type of user authentication information registered in advance for a second type of user who has stored the data in the memory area; and
   an informing portion that receives, from the determination portion, a determination result indicating that none of the three conditions satisfies the security requirements, and sends through the network, to at least one of the second type of user who has stored the data corresponding to the determination result in the memory area and the first type of user who has set the access restrictions for the memory area storing therein the data corresponding to the determination result, a message to prompt said at least one of the users to perform operation for satisfying the security requirements.

2. The information equipment according to claim 1, further comprising a plurality of memory areas for each of which access restrictions are set to limit the first type of user,
   wherein the determination portion makes a determination on data stored in each of the plurality of memory areas whether or not any one of the three conditions satisfies the security requirements, and
   the informing portion sends the message to at least one of the second type of user who has stored data for which none of the three conditions satisfies the security requirements and the first type of user who has set access restrictions for each of the plurality of memory areas storing said data therein.

3. The information equipment according to claim 2, wherein the determination portion includes
   a first counter that calculates a quantity of the first type of user of which user authentication information does not satisfy the security requirements,
   a second counter that calculates a quantity of a memory area for which access restrictions not satisfying the security requirements are set,
   a third counter that calculates a quantity of files for which access restrictions not satisfying the security requirements are set, and
   a comparison portion that compares calculated values thus obtained by the first counter, the second counter, and the third counter with one another, and
   the informing portion sends the message based on a comparison result thus obtained by the comparison portion in the following manner:
   if the calculated value by the first counter is a smallest value as compared with the other two calculated values, then the message is sent to a user who is a calculation target of the first counter among the second type of users who have stored the data that is a calculation target of the third counter;
   if the calculated value by the second counter is a smallest value as compared with the other two calculated values, then the message is sent to the first type of user who has set the access restrictions for the memory area that is a calculation target of the second counter; and
   if the calculated value by the third counter is a smallest value as compared with the other two calculated values, then the message is sent to the second type of user who has stored the data that is a calculation target of the third counter.

4. The information equipment according to claim 3, wherein, if a smallest value of the calculated values by the first counter, the second counter, and the third counter is smaller than a preset value, the informing portion informs an operator who has performed the operation for turning the security mode into the mode to enhance the security level as to which user corresponds to the smallest value.

5. The information equipment according to claim 1, further comprising a background pattern adding portion that, if first image data to which a background pattern is added is stored in the memory area, and if second image data to which no background pattern is added and which is stored by the second type of user who has stored the first image data in the memory area is contained in data for which access restrictions not satisfying the security requirements are set, adds a same background pattern as that added to the first image data to the second image data.

6. A computer-readable storage medium storing thereon a computer program used in a computer for controlling information equipment that includes a memory area for which access restrictions are set to limit a first type of user and is connectable to a network, the computer program causing the computer to implement:
   a determination portion that makes a determination, in response to operation for turning a security mode into a mode to enhance a security level, on data stored in the memory area, whether or not any one of the following three conditions satisfies security requirements after the security level is enhanced: access restrictions set for the data itself; access restrictions set for the memory area; and second type of user authentication information registered in advance for a second type of user who has stored the data in the memory area; and
   an informing portion that receives, from the determination portion, a determination result indicating that none of the three conditions satisfies the security requirements, and sends through the network, to at least one of the second type of user who has stored the data corresponding to the determination result in the memory area and the first type of user who has set the access restrictions for the memory area storing therein the data corresponding to the determination result, a message to prompt said at least one of the users to perform operation for satisfying the security requirements.

7. The computer-readable storage medium according to claim 6,
   wherein the determination portion makes a determination, on data stored in each of a plurality of memory areas for each of which access restrictions are set to limit the first type of user, whether or not any one of the three conditions satisfies the security requirements, and
   the informing portion sends the message to at least one of the second type of user who has stored data for which none of the three conditions satisfies the security requirements and the first type of user who has set access restrictions for each of the plurality of memory areas storing said data therein.

8. The computer-readable storage medium according to claim 7,
wherein the determination portion includes
a first counter that calculates a quantity of the first type of user of which user authentication information does not satisfy the security requirements,
a second counter that calculates a quantity of a memory area for which access restrictions not satisfying the security requirements are set,
a third counter that calculates a quantity of files for which access restrictions not satisfying the security requirements are set, and
a comparison portion that compares calculated values thus obtained by the first counter, the second counter, and the third counter with one another, and
the informing portion sends the message based on a comparison result thus obtained by the comparison portion in the following manner:
if the calculated value by the first counter is a smallest value as compared with the other two calculated values, then the message is sent to a user who is a calculation target of the first counter among the second type of users who have stored the data that is a calculation target of the third counter;
if the calculated value by the second counter is a smallest value as compared with the other two calculated values, then the message is sent to the first type of user who has set the access restrictions for the memory area that is a calculation target of the second counter; and
if the calculated value by the third counter is a smallest value as compared with the other two calculated values, then the message is sent to the second type of user who has stored the data that is a calculation target of the third counter.

9. The computer-readable storage medium according to claim 8, wherein, if a smallest value of the calculated values by the first counter, the second counter, and the third counter is smaller than a preset value, the informing portion informs an operator who has performed the operation for turning the security mode into the mode to enhance the security level as to which user corresponds to the smallest value.

10. The computer-readable storage medium according to claim 9, the computer program causing the computer to further implement a background pattern adding portion that, if first image data to which a background pattern is added is stored in the memory area, and if second image data to which no background pattern is added and which is stored by the second type of user who has stored the first image data in the memory area is contained in data for which access restrictions not satisfying the security requirements are set, adds a same background pattern as that added to the first image data to the second image data.

11. A method for supporting operation of information equipment that includes a memory area for which access restrictions are set to limit a first type of user and is connectable to a network, the method causing the information equipment to perform a process comprising:
in response to operation for turning a security mode into a mode to enhance a security level, a step of making a determination on data stored in the memory area whether or not any one of the following three conditions satisfies security requirements after the security level is enhanced: access restrictions set for the data itself; access restrictions set for the memory area; and second type of user authentication information registered in advance for a second type of user who has stored the data in the memory area; and
a step of sending through the network, if data not satisfying any of the three conditions is found, to at least one of the second type of user who has stored the data in the memory area and the first type of user who has set the access restrictions for the memory area storing therein the data, a message to prompt said at least one of the users to perform operation for satisfying the security requirements.

12. The method according to claim 11,
wherein the information equipment includes a plurality of memory areas for each of which access restrictions are set to limit the first type of user,
said step of making a determination includes making a determination on data stored in each of the plurality of memory areas whether or not any one of the three conditions satisfies the security requirements, and
said step of sending includes sending the message to at least one of the second type of user who has stored data for which none of the three conditions satisfies the security requirements and the first type of user who has set access restrictions for each of the plurality of memory areas storing said data therein.

13. The method according to claim 12, wherein said step of making a determination includes
a first counting step of calculating a quantity of the first type of user of which user authentication information does not satisfy the security requirements,
a second counting step of calculating a quantity of a memory area for which access restrictions not satisfying the security requirements are set,
a third counting step of calculating a quantity of files for which access restrictions not satisfying the security requirements are set, and
a comparison step of comparing calculated values thus obtained in the first counting step, the second counting step, and the third counting step with one another, and
said step of sending includes sending the message based on a comparison result thus obtained in the comparison step in the following manner:
if the calculated value in the first counting step is a smallest value as compared with the other two calculated values, then the message is sent to a user who is a calculation target of the first counting step among the second type of users who have stored the data that is a calculation target of the third counting step;
if the calculated value by the second counting step is a smallest value as compared with the other two calculated values, then the message is sent to the first type of user who has set the access restrictions for the memory area that is a calculation target of the second counting step; and
if the calculated value by the third counting step is a smallest value as compared with the other two calculated values, then the message is sent to the second type of user who has stored the data that is a calculation target of the third counting step.

14. The method according to claim 13, wherein, if a smallest value of the calculated values in the first counting step, the second counting step, and the third counting step is smaller than a preset value, said step of sending includes informing an operator who has performed the operation for turning the security mode into the mode to enhance the security level as to which user corresponds to the smallest value.

15. The method according to claim 12, further comprising a background pattern adding step that, if first image data to which a background pattern is added is stored in the memory area, and if second image data to which no background pattern is added and which is stored by the second type of user who has stored the first image data in the memory area is contained in data for which access restrictions not satisfying the security requirements are set, adds a same background pattern as that added to the first image data to the second image data.

* * * * *